US012801919B2

(12) United States Patent
Moukari et al.

(10) Patent No.: US 12,801,919 B2
(45) Date of Patent: Nov. 17, 2026

(54) SYSTEM AND METHOD FOR ASSISTING WITH THE NAVIGATION OF A MOBILE SYSTEM

(71) Applicant: SAFRAN, Paris (FR)

(72) Inventors: Michel Moukari, Moissy-Cramayel (FR); Ahmed Nasreddinne Benaichouche, Moissy-Cramayel (FR)

(73) Assignee: SAFRAN, Paris (FR)

(*) Notice: Subject to any disclaimer, the term of this patent is extended or adjusted under 35 U.S.C. 154(b) by 0 days.

(21) Appl. No.: 19/123,796

(22) PCT Filed: Nov. 7, 2023

(86) PCT No.: PCT/FR2023/051741
§ 371 (c)(1),
(2) Date: Apr. 24, 2025

(87) PCT Pub. No.: WO2024/100349
PCT Pub. Date: May 16, 2024

(65) Prior Publication Data

US 2026/0178899 A1 Jun. 25, 2026

(30) Foreign Application Priority Data

Nov. 7, 2022 (FR) ...................................... 2211564

(51) Int. Cl.
*G06V 10/82* (2022.01)
*B60W 60/00* (2020.01)
(Continued)

(52) U.S. Cl.
CPC ............. *G06N 3/08* (2013.01); *B60W 60/001* (2020.02); *G06N 3/045* (2023.01); *G06N 3/063* (2013.01);
(Continued)

(58) Field of Classification Search
None
See application file for complete search history.

(56) References Cited

U.S. PATENT DOCUMENTS 10,726,567 B2 * 7/2020 Lee ......................... G01S 17/86
11,169,531 B2 * 11/2021 Hong ................ B60W 30/0956
11,537,139 B2 * 12/2022 Rankawat ........... B60W 60/001

FOREIGN PATENT DOCUMENTS

EP 3 945 349 A1 2/2022

OTHER PUBLICATIONS

International Search Report issued Apr. 9, 2024 in International Application No. PCT/FR2023/051741.
(Continued)

*Primary Examiner* — Todd Melton
(74) *Attorney, Agent, or Firm* — Sughrue Mion, PLLC

(57) ABSTRACT

A method for assisting navigation of a mobile system includes obtaining an optical image of a scene acquired by a camera, obtaining a 3D point cloud of the scene acquired by a range-finder, projecting, in 2D into a reference frame of the camera, the 3D points of the 3D point cloud and a measurement uncertainty to provide a depth image and an uncertainty mask of the depth image, determining a semantic map, a depth map and a confidence map of the depth map from the optical image by processing the optical image, the depth image and the uncertainty mask a first convolutional neural network which includes a succession of convolutional layers, each including first to third convolution blocks that estimate respectively a semantic attribute map, a depth attribute map and a confidence attribute map, and determining a scene traversability map by merging the semantic, depth, and confidence maps.

8 Claims, 3 Drawing Sheets

(51) Int. Cl.

| | |
|---|---|
| ***G06N 3/045*** | (2023.01) |
| ***G06N 3/063*** | (2023.01) |
| ***G06N 3/08*** | (2023.01) |
| ***G06N 3/084*** | (2023.01) |
| ***G06V 10/44*** | (2022.01) |
| ***G06V 10/80*** | (2022.01) |

(52) U.S. Cl.
CPC ........... *G06N 3/084* (2013.01); *G06V 10/454* (2022.01); *G06V 10/80* (2022.01); *G06V 10/82* (2022.01); *B60W 2420/403* (2013.01); *B60W 2420/408* (2024.01)

(56) References Cited

OTHER PUBLICATIONS

Gu et al., "3-D LiDAR + Monocular Camera: An Inverse-Depth-Induced Fusion Framework for Urban Road Detection", IEEE Transactions On Intelligent Vehicles, vol. 3, No. 3, Sep. 2018, pp. 351-360.
Chen et al., "Lidar-histogram for fast road and obstacle detection", 2017 IEEE International Conference on Robotics and Automation (ICRA) Singapore, May 29-Jun. 3, 2017, pp. 1343-1348.
Search Report issued May 26, 2023 in French Application No. 2211564.

* cited by examiner

SYSTEM AND METHOD FOR ASSISTING WITH THE NAVIGATION OF A MOBILE SYSTEM

CROSS-REFERENCE TO RELATED APPLICATIONS

This is a National Stage of International Application No. PCT/FR2023/051741 filed Nov. 7, 2023, claiming priority based on French Patent Application No. 2211564 filed Nov. 7, 2022, the contents of each of which being herein incorporated by reference in their entireties.

TECHNICAL FIELD

The field of the invention is that of assisting the navigation of a mobile system of the robot or autonomous vehicle type moving on a terrain, and more particularly that of generating a trajectory navigable by the mobile system on the terrain.

PRIOR ART

In the field of mobile system navigation, methods that aim to detect the presence of a road in images acquired by a camera embedded in a mobile system are known. These methods use visual cues such as vanishing points, textures or relief to delineate the contours of a road on an image, or pose the problem directly as a problem of segmenting the road in the image. However, these methods do not address the paths in the broadest sense of the word, which can in particular be off-road paths that are not necessarily paved or properly delineated, and even less the more general theme of traversability corresponding to the identification in the acquired images of areas of the terrain on which the mobile system would be able to move.

There are also methods based on neural network models that identify the type of ground on which the vehicle is moving. For example, document WO 2019/241022 A1 describes a solution using a pre-trained deep neural network to perform the detection of a navigable way that is not necessarily delineated by road markings.

DISCLOSURE OF THE INVENTION

The objective of the invention is to propose a solution for generating a traversable trajectory for a mobile system moving over a terrain that is both reliable and efficient.

To this end, the invention proposes a computer-implemented method for assisting the navigation of a mobile system, comprising:

- obtaining an optical image of a scene acquired by a camera embedded on board the mobile system;
- obtaining a 3D point cloud of the scene acquired by a range-finder embedded on board the mobile system;
- projecting, in 2D into the reference frame of the camera, the 3D points of the cloud and an uncertainty relating to the measurement of each of the 3D points of the cloud to provide, respectively, a depth image and an uncertainty mask of the depth image;
- determining a semantic map of the scene, a depth map of the scene and a confidence map of the depth map from the optical image, the depth image and the uncertainty mask of the depth image;
- determining a traversability map of the scene by the mobile system by merging the semantic map, the depth map and the confidence map of the depth map.

Some preferred but non-limiting aspects of this method are as follows:

- the determination of the semantic map of the scene, the depth map of the scene and the confidence map of the depth map comprises the processing of the optical image, the depth image and the uncertainty mask of the depth image by a first convolutional neural network which comprises a succession of convolutional layers, each convolutional layer comprising a first convolution block capable to estimate a semantic attribute map, a second convolution block capable to estimate a depth attribute map and a third convolution block capable to estimate a confidence attribute map;
- the second convolution block of a convolutional layer of rank N+1 in the succession of convolutional layers is configured to:
  - calculate the product of the confidence attribute map estimated by the third convolution block of the convolutional layer of rank N in the succession of convolutional layers with the depth attribute map estimated by the second convolution block of the convolutional layer of rank N in the succession of convolutional layers;
  - calculate a first convolution result by applying a convolution kernel to said product;
  - calculate a second convolution result by applying the convolution kernel to the confidence attribute map estimated by the third convolution block of the convolutional layer of rank N in the succession of convolutional layers;
  - calculate the ratio of the first and second correlation results;
- the second convolution block of a convolutional layer of rank N+1 in the succession of convolutional layers is configured to:
  - calculate the product of the confidence attribute map estimated by the third convolution block of the convolutional layer of rank N in the succession of convolutional layers with a concatenation map resulting from the concatenation of the semantic attribute map estimated by the first convolution block of the convolutional layer of rank N in the succession of convolutional layers and of the depth attribute map estimated by the second convolution block of the convolutional layer of rank N in the succession of convolutional layers;
  - calculate a first convolution result by applying a convolution kernel to said product;
  - calculate a second convolution result by applying the convolution kernel to the confidence attribute map estimated by the third convolution block of the convolutional layer of rank N in the succession of convolutional layers;
  - calculate the ratio of the first and second correlation results;
- the second convolution block of the convolutional layer of rank N+1 in the succession of convolutional layers is further configured to add a bias to the ratio of the first and second correlation results;
- the first convolution block of a convolutional layer of rank N+1 in the succession of convolutional layers takes as input a concatenation map resulting from the concatenation of the semantic attribute map estimated by the first convolution block of the convolutional layer of rank N in the succession of convolutional layers with the depth attribute map estimated by the second convolution block of the convolutional layer of rank N in the succession of convolutional layers;

the merging of the semantic map, the depth map and the confidence map of the depth map comprises the determination of a concatenation map by concatenating the semantic map, the depth map and the confidence map of the depth map, and the processing of the concatenation map by a second convolutional neural network.

The invention also relates to a computer program product comprising instructions which, when the program is executed by a computer, cause the latter to implement the steps of the method according to the invention. The invention also extends to a terrain mapping device intended to be embedded in a mobile system, comprising a processor configured to implement the steps of the method according to the invention.

BRIEF DESCRIPTION OF THE DRAWINGS

Other aspects, aims, advantages and characteristics of the invention will become more apparent upon reading the following detailed description of preferred embodiments thereof, given by way of non-limiting example, and made with reference to the appended drawings in which.

DETAILED DISCLOSURE OF PARTICULAR EMBODIMENTS

The invention relates in particular to a terrain mapping device intended to be embedded in a mobile system, for example an all-terrain land mobile system such as a robot, a drone or an autonomous vehicle.

This device comprises a traversability estimation unit configured to generate a trajectory traversable by the mobile system from a stream of images from a camera and depth measurements from a range-finder.

Since the generation of a reliable trajectory requires perception of the geometry and of the semantics of the terrain, the traversability estimation unit advantageously merges a geometric solution for estimating the 3D of the terrain (its depth in this case) with a solution for semantically segmentating the terrain. The traversability estimation unit also makes use of a confidence map associated with the reliability of the prediction of the geometric solution, which allows greatly improving performance.

The traversability estimation unit delivers a traversability map, for example a binary map in which each point of the terrain imaged by the camera is identified as being traversable or not by the mobile system or a map in which a probability of traversability is associated with each point of the terrain.

Figure 1:
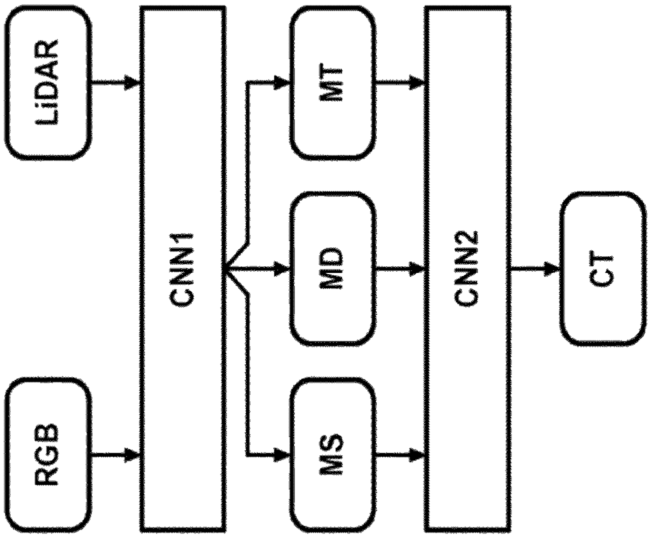
FIG. 1 is a diagram illustrating one possible embodiment of a method according to the invention.

The traversability estimation unit is configured to implement the method that will be described below with reference to FIG. 1.

This method comprises a RGB step of obtaining an optical image of a scene (in this case, a terrain over which the mobile system is moving), acquired by a camera embedded on board the mobile system. The camera is for example a monocular camera. The images successively acquired by the camera are typically RGB images of the terrain, ensuring functionality in visible light. In one variant of embodiment, nighttime operation is ensured by making use of another wavelength range (infrared, for example).

The method further comprises a LIDAR step of obtaining a 3D point cloud of the scene acquired by a range-finder embedded on board the mobile system. The range-finder is for example a laser range-finder, such as a LIDAR. The method then comprises a step of projecting, in 2D in the reference frame of the camera, the 3D points of the cloud and an uncertainty relating to the measurement of each of the 3D points of the cloud to respectively provide a depth image and an uncertainty mask of the depth image (i.e., a map in which an uncertainty relating to the determination of the depth is associated with each point of the terrain).

The range-finder provides sparse depth measurements that are generally artificially densified by encoding the unobserved pixels. Moreover, by using the power (amplitude) of the signal received by the range-finder, which corresponds for example to the amount of light returning to the sensor after a shot, it is possible to infer an uncertainty on the depth measurements. Indeed, the amount of light received back by the sensor is directly correlated to the material on which it is projected and provides information on the reliability of the distance calculated at that point.

The method then comprises a step of determining a semantic map MS of the scene, a depth map MD of the scene and a confidence map MT of the depth map from the optical image, the depth image and the uncertainty mask of the depth image. This step is for example implemented by a first convolutional neural network CNN1 suitably pre-trained for this purpose.

This step performs the simultaneous inference of the 3D (depth map) and of the semantics of the image (semantic map). This results in better prediction of these two modalities, with minimalized calculation time. Moreover, this step makes use of an uncertainty determined a priori from the telemetry data to estimate reliability (the confidence map) of the predictions.

The method continues with a step of determining a traversability map CT of the scene by the mobile system by merging the semantic map, the depth map and the confidence map of the depth map. This step is for example implemented by a second convolutional neural network CNN2 suitably pre-trained for this purpose. This step leverages both modalities (3D and semantics) and merges them using the confidence as a weighting.

Figure 2:
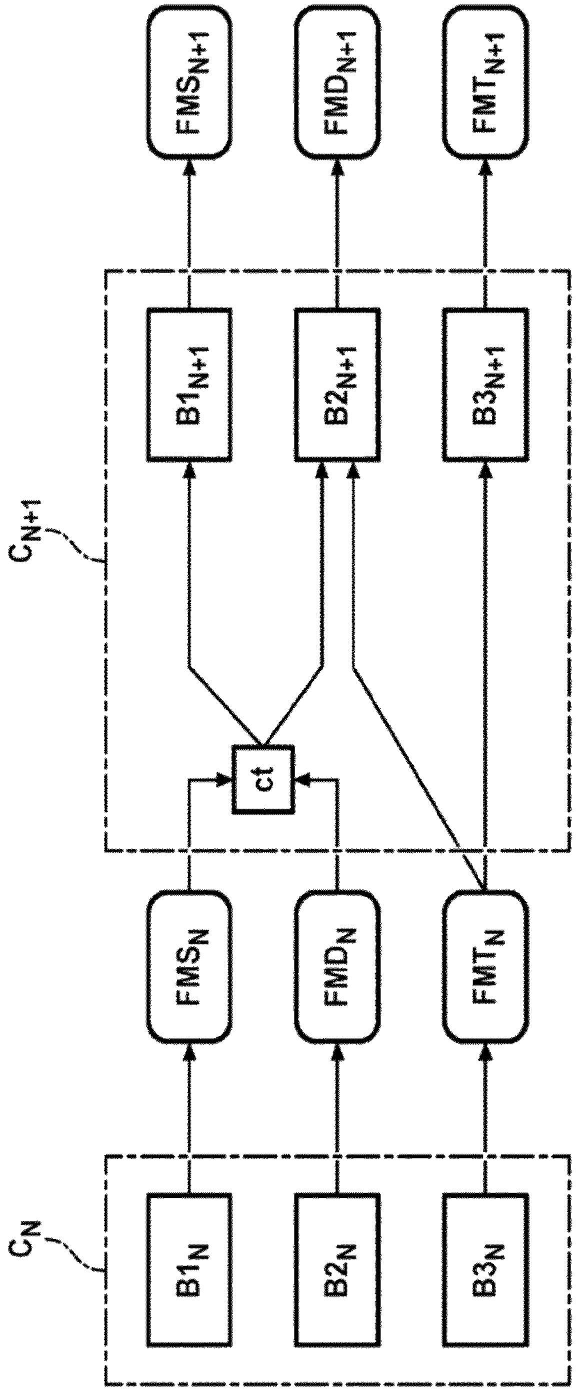
FIG. 2 represents the operations carried out by a convolutional layer of a first convolutional neural network that can be used by the invention.

With reference to FIG. 2, the first convolutional neural network CNN1 comprises a succession of convolutional layers $C_N$, $C_{N+1}$ and each convolutional layer may comprise a first convolution block $\mathbf{B1}_N$, $\mathbf{B1}_{N+1}$ capable to estimate a semantic attribute map $FMS_N$, $FMS_{N+1}$, a second convolution block $\mathbf{B2}_N$, $\mathbf{B2}_{N+1}$ capable to estimate a depth attribute map $FMD_N$, $FMD_{N+1}$ and a third convolution block $\mathbf{B3}_N$, $\mathbf{B3}_{N+1}$ capable to estimate a confidence attribute map $FMT_N$, $FMT_{N+1}$.

In one possible embodiment, the first convolution block $\mathbf{B1}_{N+1}$ of the convolutional layer of rank N+1 in the succession of convolutional layers takes as input the semantic attribute map $FMS_N$ estimated by the first convolution block $\mathbf{B1}_N$ of the convolutional layer of rank N in the succession of convolutional layers. This is true for N integer greater than or equal to 1, while the first convolution block of the first convolutional layer in the succession of convolutional layers takes as input the optical image.

In one alternative embodiment represented in FIG. 2, the first convolution block $\mathbf{B1}_{N+1}$ of the convolutional layer of rank N+1 in the succession of convolutional layers takes as input a concatenation map resulting from the concatenation, identified by the reference ct in FIG. 2, of the semantic attribute map $FMS_N$ estimated by the first convolution block $\mathbf{B1}_N$ of the convolutional layer of rank N in the succession of convolutional layers and of the depth attribute map $FMD_N$ estimated by the second convolution block $\mathbf{B2}_N$ of the convolutional layer of rank N. This is true for N integer greater than or equal to 1, while the first convolution block of the first convolutional layer in the succession of convolutional layers takes as input the concatenation of the optical image and of the depth image.

In this alternative embodiment, the first convolutional neural network thus comprises a first branch (the succession of the first convolution blocks) that works on estimating the semantics of the scene by leveraging the optical information from the camera as well as the depth information from the range-finder. This improves the semantic segmentation.

In one possible implementation, the second convolution block $\mathbf{B2}_{N+1}$ of the convolutional layer of rank N+1 in the succession of convolutional layers takes as input the depth attribute map $FMD_N$ estimated by the second convolution block $\mathbf{B2}_N$ of the convolutional layer of rank N in the succession of convolutional layers and the confidence attribute map $FMS_N$ estimated by the third convolution block $\mathbf{B3}_N$ of the convolutional layer of rank N in the succession of convolutional layers. This is true for N integer greater than or equal to 1, while the second convolution block of the first convolutional layer in the succession of convolutional layers takes as input the depth image and the uncertainty mask of the depth map.

In one alternative embodiment represented in FIG. 2, the second convolution block $\mathbf{B2}_{N+1}$ of the convolutional layer of rank N+1 in the succession of convolutional layers takes as input, on the one hand the concatenation map resulting from the concatenation, identified by the reference ct, of the semantic attribute map $FMS_N$ estimated by the first convolution block $\mathbf{B1}_N$ of the convolutional layer of rank N in the succession of convolutional layers and of the depth attribute map $FMD_N$ estimated by the second convolution block $\mathbf{B2}_N$ of the convolutional layer of rank N and, on the other hand, the confidence attribute map $FMS_N$ estimated by the third convolution block $\mathbf{B3}_N$ of the convolutional layer of rank N in the succession of convolutional layers. This is true for N integer greater than or equal to 1, while the second convolution block of the first convolutional layer in the succession of convolutional layers takes as input, on the one hand, the concatenation of the optical image and of the depth image and, on the other hand, the uncertainty mask of the depth map.

In this alternative implementation, the first convolutional neural network thus comprises a second branch (the succession of the second convolution blocks) which works on estimating the depth of the scene by leveraging the depth information from the range-finder as well as the optical information from the camera. This improves the semantic depth estimation.

Moreover, in both previously mentioned embodiments, an a priori uncertainty about the range-finder measurements is propagated throughout the succession of the convolutional layers, which allows obtaining confidence on the quality and reliability of the output predictions.

Figure 3:
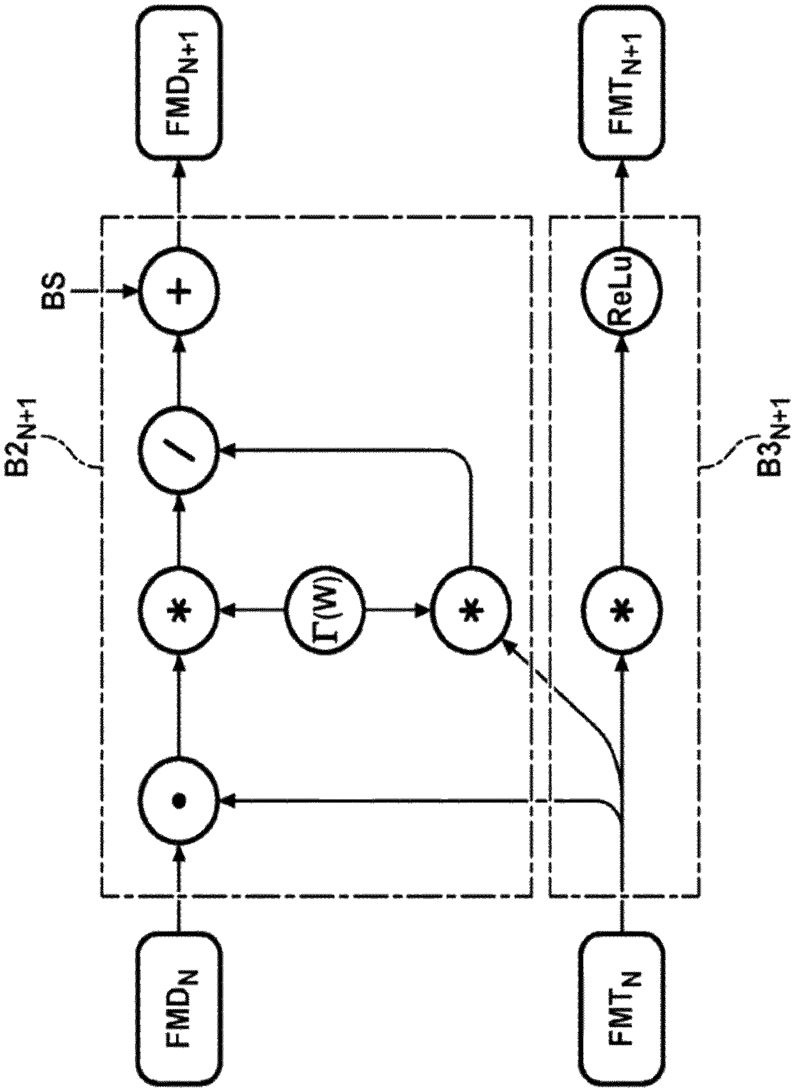
FIG. 3 more particularly represents the operations carried out by the second and third convolution blocks of a convolutional layer of a first convolutional neural network that can be used by the invention.

FIG. 3 represents one possible embodiment of operations implemented by the second and third convolution blocks of a convolutional layer of the first convolutional neural network. In this FIG. 3, · corresponds to a point-by-point multiplication, * to a convolution, / to a division and + to an addition. Γ(W) represents the kernel of the convolution.

Consider X as a tensor representing an input signal, C as a positive scalar function representing the confidence (or certainty) for each value of X, B as a tensor representing the basis of a filtering operator and B* as its conjugate and A as a positive scalar function representing the applicability for each value of B. The normalized convolution can be written as follows:

$$Y_N = N^{-1}D \tag{1}$$

where:

$$D = AB * CX \tag{2}$$

$$N = (ABB^*) * C \tag{3}$$

In the equation (1), N is the normalization factor. For example, considering the case where the confidence C is constant and B=1, the equation (1) becomes:

$$Y_N = \frac{A*(CX)}{A*C} <=> \frac{A*X}{A*1} <=> A'*X \tag{4}$$

where the convolution parameters A' are the normalized version of A.

In the framework of the invention, the learning of the first neural network is carried out in such a way as to determine the parameters corresponding to the product AB for a task of generating the depth map from sparse input data associated with an a priori confidence. More specifically, the basis B is set to be equal to a tensor of 1 and the applicability function A is learned during the network training phase.

Referring to FIG. 3, the applicability function A corresponds to the convolution parameters. Because the applicability must remain a positive function, the positivity of the convolution weights must be guaranteed. Thus, a softplus function Γ(·) can be applied to the weights W of the convolution. Based on the equation (1), the depth propagation becomes:

$$Y_N = \frac{\Gamma(W)*(CX)}{\Gamma(W)*C} \tag{5}$$

Thus, the second convolution block $\mathbf{B2}_{N+1}$ of a convolutional layer of rank N+1 in the succession of convolutional layers can be configured to:

- calculate the product (by means of the point-by-point multiplication ·) of the confidence attribute map $FMT_N$ estimated by the third convolution block of the convolutional layer of rank N in the succession of convolutional layers with a concatenation map resulting from the concatenation of the semantic attribute map $FMS_N$ estimated by the first convolution block of the convolutional layer of rank N in the succession of convolutional layers and of the depth attribute map $FMD_N$ estimated by the second convolution block of the convolutional layer of rank N in the succession of convolutional layers;
- calculate a first convolution result by applying the convolution kernel Γ(W) to said product;

calculate a second convolution result by applying the convolution kernel Γ(W) to the confidence attribute map estimated by the third convolution block of the convolutional layer of rank N in the succession of convolutional layers;

calculate the ratio, by means of the division /, of the first and second correlation results.

As seen previously, in another possible implementation, the second convolution blocks take as input only the depth attributes $FMD_N$, and not the result of their concatenation with the semantic attributes $FMS_N$. This other possible embodiment is illustrated in FIG. 3 and according to it the second convolution block $\mathbf{B2}_{N+1}$ of a convolutional layer of rank N+1 in the succession of convolutional layers is configured to:

calculate the product (by means of the point-by-point multiplication ·) of the confidence attribute map $FMT_N$ estimated by the third convolution block of the convolutional layer of rank N in the succession of convolutional layers with the depth attribute map $FMD_N$ estimated by the second convolution block of the convolutional layer of rank N in the succession of convolutional layers;

calculate a first convolution result by applying the convolution kernel γ(W) to said product;

calculate a second convolution result by applying the convolution kernel Γ(W) to the confidence attribute map estimated by the third convolution block of the convolutional layer of rank N in the succession of convolutional layers;

calculate the ratio, by means of the division /, of the first and second correlation results.

Moreover, in either of the above-mentioned embodiments, and as also represented in FIG. 3, each second convolution block can be further configured to add a bias term BS to the result of the ratio of the first and second correlation results. This bias term increases the capacity of the first neural network.

FIG. 3 also illustrates a third convolution block $\mathbf{B3}_{N+1}$. This block performs conventional convolution for the propagation of the confidence. This block can include a ReLU (Rectifier Linear Unit) activation function to ensure the positivity and maintain the dimension between the confidence attribute maps and the depth attribute maps.

Similarly, the first convolution blocks that determine the semantic attribute maps can take the form of conventional convolution blocks.

One possible embodiment of the learning of the first convolutional neural network makes use of the following cost function to learn to regress the depth and model the inverse of the uncertainty (i.e., the confidence). Let S be a set of coordinates where the depth value is entered in the ground truth, $\log(C_{(uv)})$ the predicted log-confidence, $y_{(u,v)}$ the depth ground truth, and $\hat{y}_{(u,v)}$ the predicted depth. The cost function can be defined as follows:

$$\mathbb{L}_p = \left\| y_{(u,v)} - \hat{y}_{(u,v)} \right\|_p \tag{6}$$

$$\text{Pen} = \log(C_{(u,v)}) \tag{7}$$

$$\mathcal{L} = \frac{1}{\text{card}(S)} \sum_{u,v \in S} e^{\log(C_{(u,v)})} \cdot \mathbb{L}_p - \lambda .\ \text{Pen} \tag{8}$$

In the equation (8), λ is a hyperparameter, $\mathbb{L}_p$ is the regression error defined by the equation (6), and Pen is a penalty term defined by the equation (7) that prevents the case where the output confidences are equal to 0. In this equation (8), the term on the left is the product of the regression error and the confidence. The p-norm is to be replaced by the desired regression error.

Through this multiplication, the confidence acts as a weighting on the regression error and therefore impacts the learning speed, both globally and relatively. First, globally, because when λ decreases, the value of the average confidence also decreases, therefore the learning speed decreases globally. And relatively, because the greater the entropy of the confidence distribution, the more the impact on the learning speed will vary depending on the spatial locations. The choice of λ therefore controls the average confidence and the entropy of the distribution, thus impacting the learning.

In practice, a prediction of the log confidence can be performed to improve the learning stability. Also, in order to maintain the confidence outputs in the interval [0, 1] to facilitate the interpretation of the results, an activation (−1)×ReLU can be performed on the last layer to obtain a negative log confidence, which allows producing a final confidence output in the interval [0, 1].

The first convolutional neural network outputs a semantic map MS, a depth map MD and a confidence map MT of the depth map. The determination of the traversability map CT of the scene by the mobile system can comprise the determination of a concatenation map by concatenating the semantic map, the depth map and the confidence map of the depth map, and the processing of the concatenation map by the second convolutional neural network CNN2. This second network can be a convolutional network of conventional architecture.

The invention claimed is:

1. A computer-implemented method for assisting the navigation of a mobile system, the computer-implemented method comprising:

obtaining an optical image of a scene acquired by a camera embedded on board the mobile system;

obtaining a 3D point cloud of the scene acquired by a range-finder embedded on board the mobile system, wherein the 3D point cloud is a collection of 3D points;

projecting, in 2D into a reference frame of the camera, the 3D points of the 3D point cloud and a measurement uncertainty related to each of the 3D points of the 3D point cloud to provide, respectively, a depth image and an uncertainty mask of the depth image;

determining a semantic map of the scene, a depth map of the scene and a confidence map of the depth map from the optical image, the depth image and the uncertainty mask of the depth image, wherein said determining comprises processing the optical image, the depth image and the uncertainty mask of the depth image by a first convolutional neural network which comprises a succession of convolutional layers, each convolutional layer comprising a first convolution block configured to estimate a semantic attribute map, a second convolution block configured to estimate a depth attribute map and a third convolution block configured to estimate a confidence attribute map; and determining a scene traversability map by merging the semantic map, the depth map and the confidence map of the depth map.

2. The computer-implemented method according to claim 1, wherein the second convolution block of a convolutional layer of rank N+1 in the succession of convolutional layers is configured to:

calculate a product of the confidence attribute map estimated by the third convolution block of the convolutional layer of rank N in the succession of convolutional layers with the depth attribute map estimated by the second convolution block of the convolutional layer of rank N in the succession of convolutional layers;

calculate a first convolution result by applying a convolution kernel to said product;

calculate a second convolution result by applying the convolution kernel to the confidence attribute map estimated by the third convolution block of the convolutional layer of rank N in the succession of convolutional layers; and calculate a ratio of the first and second correlation results.

3. The computer-implemented method according to claim 2, wherein the second convolution block of the convolutional layer of rank N+1 in the succession of convolutional layers is further configured to add a bias to the ratio of the first and second correlation results.

4. The computer-implemented method according to claim 1, wherein the second convolution block of a convolutional layer of rank N+1 in the succession of convolutional layers is configured to:

calculate a product of the confidence attribute map estimated by the third convolution block of the convolutional layer of rank N in the succession of convolutional layers with a concatenation map resulting from a concatenation of the semantic attribute map ($FMS_N$) estimated by the first convolution block ($B1_N$) of the convolutional layer of rank N ($C_N$) in the succession of convolutional layers and of the depth attribute map ($FMD_N$) estimated by the second convolution block ($B2_N$) of the convolutional layer of rank N ($C_N$) in the succession of convolutional layers;

calculate a first convolution result by applying a convolution kernel to said product;

calculate a second convolution result by applying the convolution kernel to the confidence attribute map estimated by the third convolution block of the convolutional layer of rank N in the succession of convolutional layers; and calculate a ratio of the first and second correlation results.

5. The computer-implemented method according to claim 1, wherein the first convolution block of a convolutional layer of rank N+1 in the succession of convolutional layers takes as input a concatenation map resulting from a concatenation of the semantic attribute map estimated by the first convolution block of the convolutional layer of rank N in the succession of convolutional layers with the depth attribute map estimated by the second convolution block of the convolutional layer of rank N in the succession of convolutional layers.

6. The method according to claim 1, wherein merging the semantic map, the depth map and the confidence map of the depth map comprises determining a concatenation map by concatenating the semantic map, the depth map and the confidence map of the depth map, and processing the concatenation map by a second convolutional neural network.

7. A non-transitory computer-readable medium storing a program having instructions that, when executed by a computer, cause the computer to execute the method according to claim 1.

8. A terrain mapping device, comprising a processor configured to execute the method according to claim 1.

* * * * *